United States Patent [19]

Dao et al.

[11] 4,376,883

[45] Mar. 15, 1983

[54] MONITORING WELD QUALITY VIA FORGING ASSEMBLY DYNAMICS

[75] Inventors: Tan K. Dao, Chicago; Vance B. Gold, Lombard; Edward F. Kubacki, Marengo; Walter J. Sieverin, McHenry, all of Ill.

[73] Assignee: American Can Company, Greenwich, Conn.

[21] Appl. No.: 173,724

[22] Filed: Jul. 30, 1980

[51] Int. Cl.³ ............................................. B23K 11/06
[52] U.S. Cl. ..................................... 219/109; 219/65; 219/82; 219/86.41
[58] Field of Search ................. 219/86.41, 86.51, 109, 219/110, 117.1, 81, 82, 83, 65

[56] References Cited

U.S. PATENT DOCUMENTS

| | | | |
|---|---|---|---|
| 2,236,998 | 4/1941 | Gillette | 219/81 |
| 3,400,242 | 9/1968 | Waller | 219/110 |
| 3,430,027 | 2/1969 | Denis | 219/81 |
| 3,573,416 | 4/1971 | Drechsler | 219/110 |
| 3,823,299 | 7/1974 | Metcalfe et al. | 219/110 |
| 4,028,522 | 6/1977 | Chihoski et al. | 219/109 |

FOREIGN PATENT DOCUMENTS

| | | | |
|---|---|---|---|
| 1038171 | 10/1959 | France | 219/109 |
| 703270 | 12/1979 | U.S.S.R. | 219/109 |
| 724293 | 3/1980 | U.S.S.R. | 219/109 |

*Primary Examiner*—C. C. Shaw
*Attorney, Agent, or Firm*—Paul R. Audet; Aaron Passman; Stuart S. Bowie

[57] ABSTRACT

To measure the relative power during a welding process, a position sensitive transducer is attached to a welding electrode to submit a signal in response to electrode motion. An accelerometer, carried on an axle of an electrode roll for a Soudronics pulse type resistance welder, will emit a signal indicative of the quality of the weld. The accelerometer measures the forging taking place during welding by means of its position sensitivity and the amount of forging has been found to be a function of the characteristics of the weld.

9 Claims, 5 Drawing Figures

MONITORING WELD QUALITY VIA FORGING ASSEMBLY DYNAMICS

BACKGROUND OF THE INVENTION

This invention relates to an apparatus for measuring the relative power consumed during a welding process and, in particular, covers an apparatus to be used as a transducer in connection with a Soudronic welder adapted to weld the longitudinal side seam of a thin metal can body. Soudronic ®, a Trademark of Soudronic A. G. of Switzerland, 8962 Bergdietikon 2H, Schwerz, Suisse, welders for this type of application have a secondary transformer rating of 4 to 8 volts and 5000 amps. The welding is AC resistance type in the frequency range of about 50 to 500 Hz with each alternating waveform producing a power pulse. A traveling electrode being a copper wire is positioned between the surfaces to be welded and the electrode rolls connected to the output terminals of the secondary winding of the welding transformer. The copper wire is used between each of the electrodes and the metal surface to be welded and is moved continuously in order to prevent deterioration of the welding electrodes.

Can bodies are generally hollow cylindrical constructions which are formed along a longitudinal edge into a closed cylinder leaving both ends open. The meeting edges of the cylinder thus formed from a flat blank of material are overlapped for purposes of welding. The blanks are preferably fashioned from preprinted (lithography), tinplate or tin free steel chrome-type such as MRT3 Such material presently ranges from 65 to 112 pound plate weight per base box which represents a range of 0.007" to 0.0123" in thickness depending upon the application of the container to be formed from the tinplate and/or tin free steel chrome-type. A welded side seam is preferable to other forms to side seams such as a soldered can seam or a glued together joint. More particularly, in aerosol containers which must be capable of withstanding up to 200 pounds per square inch of internal pressure, a welded longitudinal side seam has a great many advantages. Similarly, in containers which are of a particular configuration which is too large to be drawn (as, for example, a two-piece container is), a welded side seam gives the requisite strength and simplifies the manufacture of such containers as they are too long or too large for drawing. In other applications it is important to have lithograph information on the exterior surface of the containers. Quality lithography cannot be applied at high-speed to a preformed drawn container so a container with a manufactured side seam is required.

Hall effect devices have been used in connection with a number of transducer applications some of which have been applied to welding machines see, for example, Noth U.S. Pat. No. 3,240,961; Hill U.S. Pat. No. 3,194,939; Barnhart et al U.S. Pat. No. 3,335,258 and Treppa et al U.S. Pat. No. 3,389,239. Each of the foregoing is designed to use a Hall device in combination with a welder for purposes of current determination. Similarly, the Hood U.S. Pat. No. 3,365,665 shows a Hall transducer which has been used in a system for measuring current flow in high voltage conductors e.g. power lines. Assignee of the present invention has a co-pending application on a Hall effect transducer, U.S. Ser. No. 093,855. These arrangements are not entirely responsive to the condition of the metal to be welded in that they primarily sense current flow and do not take into account the relative position of the welding electrodes. In the past welding monitors using voltage, current or Hall effect measuring transducers have been used to determine the condition of the power flow during welding. These techniques have been deficient in that they measure only one parameter which makes up the power available between the welding electrodes.

Other techniques that have been used as a means of monitoring weld quality do not possess the desired lack of sensitivity to outside effects and in most cases measure a parameter that does not totally characterize the quality of a weld. For example, monitoring welding electrode voltage only insures that a voltage is present that is sufficient to produce the necessary heating if all other factors are constant such as surface resistance and plate integrity. If either of these factors vary there will be no indication of it by monitoring the welding voltage.

As another example, monitoring welding current will yield information that insures that each attempt at weld nugget formation has sufficient current available to produce the required heating. However, should the plate weight vary, for example a 10% increase, there is no indication that welding current will change significantly since a 10% increase in thickness will result in an insignificant change in bulk material resistance. However, a 10% increase in thickness can have a significant effect on the rate of heat dissipation and the amount of metal which must be heated to an acceptable temperature. Without a corresponding change in welding current for a material thickness increase no detectable information is available on which to act.

Neither voltage nor current monitoring or the combination of the two will accurately account for the insidious effects of intermittent, variable and unpredicted shunt resistance paths. These can momentarily alter the current flowing through the desired weld zone and thereby effect the weld nugget quality without leaving a measurable trace. As a single measurable parameter the weld forging roll dynamic motion offers a method of singularly monitoring the effect of any or all weld parameter variations and to provide an indicator value with which to adjust the easily altered welding current parameter. Electrode force or voltage are other control parameters which could be adjusted. In short, monitoring the weld forging roll dynamics appears to be a good measurement tool for the purpose.

In a high-speed operation such as welding thin metal can bodies at several hundred per minute with an alternating current welder, the influences of input current and voltage as well as ambient temperature becomes significant when one is trying to measure small changes in the welder operating conditions. It is, therefore, the function of the circuit herein to completely compensate for the aforesaid conditions by providing an electrode motion responsive transducer which will be useful in monitoring the electrode forging action used to weld the side seam of a thin metal container and same will be set forth in the following summary.

SUMMARY OF THE INVENTION

A physical measuring device to determine rate of change in the electrode velocity normal to the direction of motion of the shell during welding whereby such a measurement can be used in a system for adjusting the welding power and/or rejecting defective welds. The concept appreciates that welding is a combination of heat and forging and same can be monitored by variations in the forging under constant force due to changes in the heat generated during welding. That is to say that, in areas of high resistance to the flow of welding power the heat generated will be greater thus permitting a greater amount of forging with the same amount of force. Consequently, the force on the welding electrodes, if constant, will vary the position of the electrodes relative to the weld as a function of the power flow. It becomes possible to measure the weld quality then by application of a position, velocity, or acceleration transducer mounted to an electrode.

Such a transducer will give a dynamic signal which can be looped or fed back to control any of the parameters which will change the welding power input. The overall simplicity of this system is appealing in that conventional transducers can be easily applied to existing equipment and will give measurable signals that are usable for monitoring and control.

A preferred arrangement of the present invention includes a single axis accelerometer to monitor the acceleration characteristic of the welding roll assembly in a Soudronic seam welding system. The system in its simplest form has an accelerometer attached to the spring loaded spindle for a welding roll that provides an output signal proportional to the second derivative of the vertical displacement versus time curve of the welding roll assembly or ($d^2x/dt^2$), where x is an unknown displacement dependent on the weld forging roll spring mass dynamics, material plasticity characteristics and forging roll speed. Consequently, as the spacing between the rolls varies as a function of the heating and forging process, an electrical signal proportional to acceleration is generated.

The advantage of this system for monitoring the weld operation is that in theory the welding roll dynamics should faithfully represent the result of applying heating and forging force to form a weld nugget. Stated another way, the follow-up motion of the weld forging rolls which have a fixed dynamic spring mass system will accurately and repeatably indicate whether the combination of welding parameters have achieved a successful weld nugget formation.

The accelerometer transducer is electrically isolated with a ceramic standoff riding upon the end of an outer electrode spring spindle which applies the forging force. The accelerometer is a single axis instrument for generating vertical acceleration time waveform curves as the electrode rolls are displaced during welding. Changes in the adjustment of the heat control for the welder are measurable by changes in those curves. To calibrate, the welder is run without current flowing. This establishes background vibration not beneficial to the ideal formation of individual welding nuggets, for example, vibrations caused by the feed and gauging fingers preceding the electrodes and the lap thickness transition between can bodies. The low or no current tests also indicated the effect low heat has on the dynamic, vertical motion characteristics of the outer electrode.

Recognizable and significant difference between the waveforms for acceptable production welds and incomplete welds are measurable. Reduced heating produced less plastic deformation of the steel joint between the electrodes, thus changing the slopes and the amplitudes of the accelerationtime waveforms. The repeatability of multiple waveforms made with the same welding schedule is best toward the middle of the welded seam of a given can. The transducer is sensitive to a very slight change in the heat control.

The Soudronics heat control is a precise timing device which regulates the portion of a half cycle during which welding current is flowing through the welding transformer. One hundred percent heat control means that welding current flows for the maximum possible time during each half cycle. Delaying the gate signal which triggers conduction through a control SCR would result in a shorter welding current pulse in the transformer secondary, and less heat in the weld nugget. The Soudronics heat control varies time t in equation:

Welding heat=current squared, times the resistance, times the time t.

The effects of a given heat control setting varies depending upon the characteristics of the switching of the SCR and the frequency of the alternating current flowing in the primary of the welding transformer. For example, a difference between 92% and 93% heat would produce a pulse duration change of the order of a fraction of a millisecond, and the accelerometer can sense the difference in the motion of the electrode.

The accelerometer is a non-intrusive, non-destructive sensor capable of providing real time, dynamic information and an electrical signal which is a function of the formation of very nugget in the seam. The seismic mass in the accelerometer responds to the forging phase of nugget formation, and consequently it responds to all parameters affecting heating of the weld nugget.

Considering the millions of seamweld nuggets which have been made, one must conclude that the average performance of the welder and the process are acceptable and that the vast majority of nuggets are properly formed. In order to improve process efficiency or welded seam quality the challenge is in developing a waveform pattern recognition system and discrimination strategy which will ignore the good nuggets and seek out the bad nuggets, i.e., welds. To correlate waveforms of the type generated fast enough or long enough to guarantee all cans produced, requires electronic circuitry which considers peak voltage, slope of the voltage curve, or the area under the voltage curve. An acceptable criterion for a two millisecond decision is required.

Damping of the accelerometer of filtering the electrical output will attenuate irrelevant vibration in the welding roll assembly. A single parameter measurement is used to provide feedback information to a negative feedback servo loop control system. The function of the system is to compare the measured characteristics of weld forging roll dynamics to a predetermined set point and continuously adjust a welding variable such as current and time (I & t) or heat to maintain the preferred dynamic performance.

Closed loop control in this system is extremely desirable since it will reduce process performance variation due to changing welding parameters, lack of objectivity on the part of operators and their inability to effectively follow the process because of its high speed nature. A Soudronic W.I.M.A. welding system generates many spot welds per second and this makes it impossible to exercise judgment as to the quality of each of these welds and effectively react to make corrections on a spot-to-spot basis.

In a control system, a command or standard signal can be compared to the feedback signal from the accelerometer. Any deviation or error between these inputs can be used to implement adjustment of the welding heat control setting and/or forging force. The feedback signal is from the weld forging roll accelerometer and indicates the level of heating, weld joint condition and/or the level of forging action.

Once the required level of forging associated with a good weld has been established as an input command standard level, the process can be controlled by a closed loop system which will continuously compare the input command with the feedback information. The parameters which vary under normal operation include, plate thickness, tin coating weight, forging force, electrode temperature, temper, surface roughness and surface resistance. The variations due to abnormal conditions include, joint fit up characteristics (overlap), contamination in the welding margin, burrs, abnormal shunt current paths and missing weld current pulses. Each of these parameters will result in a specific response of the forging roll accelerometer. Analysis of each will indicate that feedback information from the forging roll will be of the correct polarity or direction to provide an unambiguous control signal.

OBJECTS OF THE INVENTION

It is, therefore, an object of the present invention to provide equipment which responds to the forging process during welding of thin plate at high speeds.

It is a further object of the present invention to provide a system which is instantaneously responsive to the level of resistance between the electrodes of a welder.

It is still a further object of this invention to provide a monitor which is responsive to variations in metal plate thickness.

It is yet another object of this invention to provide a technique which is simple, reliable, low cost and has the capabilities of detecting small differences in the metals to be welded.

DETAILED DESCRIPTION OF THE DRAWINGS

Fusion processes such as electric arc, gas flame, or laser welding depend upon the flow of molten metal to achieve the bond and to overcome deficiencies in joint fitup. Resistance seamwelding of steel is like a blacksmith's forge weld. In that process, the object is to minimize overheating the metal until molten and to achieve bonding by the plastic deformation of red to white hot metal. To achieve this deformation, the blacksmith forged with his hammer. The spring loaded, welding rolls of a seam welder do multiple duty. As electrical and thermal conductors they perform vital heat control functions. At the same time, or only slightly out of phase, the electrode rolls produce the plastic deformation required for proper forging.

Figure 1:
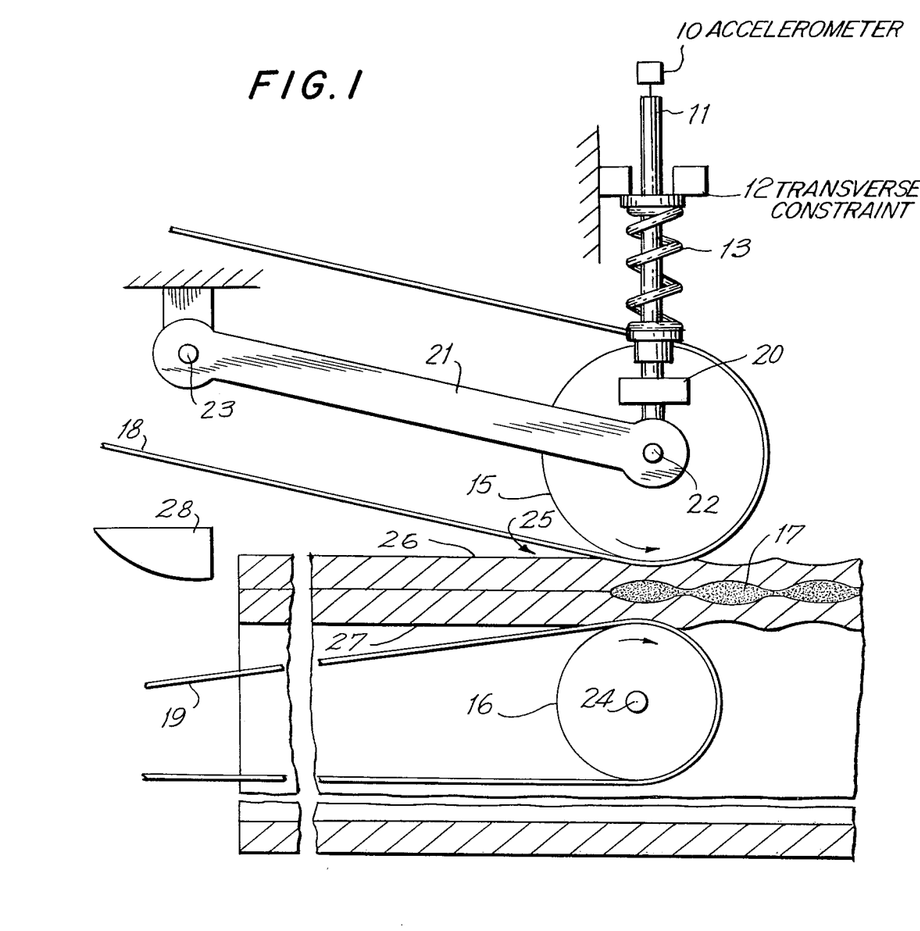
FIG. 1 is an enlarged cross-sectional schematic representation of a Soudronic welder equipped with an accelerometer and depicting in exaggerated form a lap weld.

The schematic sketch in FIG. 1 shows the preferred location of an accelerometer 10 at the end of the spring spindle 11. Transverse constraints 12 control the action of the spring 13 and keep the spring spindle 11 moving vertically. The spring 13 has a force which passes through the nip of the electrode rolls 15 and 16 for the outer and inner rolls, respectively. The weld nugget 17 being formed at any given instant of the welding is a function of the load from the spring and the welder power pulse. More particularly, a Soudronic ABM 270 (270 Hz frequency converter) produces 540 half cycle current pulses or weld nuggets per second.

A vertical force vector free body diagram would consist of the spring 13 preload acting downward, the mass of the electrode assembly accelerated by gravity, and the upward reaction force at the outer surface of the lap joint. The motion of the outer electrode roll 15 and the accelerometer 10 is analogous to that of a car's hub cap as the wheel rolls down a highway. If the road is smooth and level (i.e., no current, no heat), there is no vertical displacement. When sinusoidal welding pulses (see FIG. 1) vary the heat developed between the electrode rolls 15 and 16, the displacement of the roll is like the car wheel traversing a series of uniformly spaced potholes filled with mud. The softer the mud and the deeper the hole, the more violent is the bouncing of the wheel and the larger are the vertical acceleration vectors.

Oscilloscope photographs of acceleration-time curves have been made under various welding conditions. Without current flowing, the trace produced resembled a smooth highway, no potholes. The slight ripples in acceleration curves were due to variations in wire thickness, roll bearing eccentricities, or low level background vibrations. The differences in waveshape attributable to no heat (no current), proper heat and insufficient heat are obvious in such traces.

A moving copper wire 18 upper and 19 lower is respectively on the outside and the inside of the can seam overlap. The wire is then used at 18 and 19 as a traveling intermediate electrode. To eliminate problems of electrode contamination and for economy, both sides of the wire are used in the welding process. This is done by means of returning the wire to be used again but to use the other side thereof. The upper weld electrode roll 15 applies pressure and the current passes through both the upper and lower electrode welding rolls 15 and 16 into sections of wire 18 and 19 which are the electrodes. The overlap seam is thus fused by pulsed electric resistance welding and one spot weld is made after another. These pulses generate the weld nuggets 17. The Soudronic welder uses a round continuous length of copper wire which is flattened by profiling rolls (not shown).

The power supply for the welder is a motor operating off of standard line current which turns an alternator that generates single phase power at 380 volts and 270 cycles per second. The alternator power is the input for the primary windings for a transformer coil. This input is not constant as the Soudronics' power control circuit (not shown) includes an SCR which turns the power on for a portion of each half cycle and turns the power off when the half cycle crosses zero voltage. Consequently, the input power is on for a percentage of the total cycle and provides 540 pulses per second. Each pulse should generate sufficient heat for a proper weld i.e., weld nugget 17.

Figure 2:
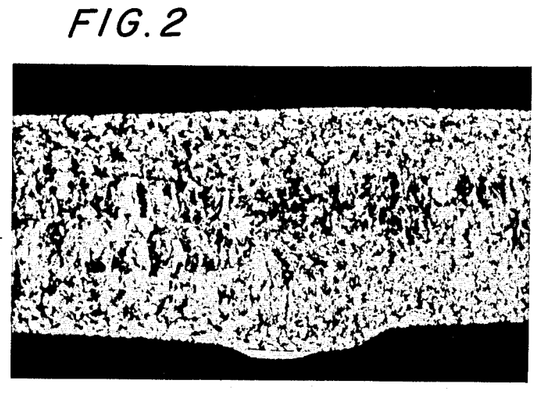
FIG. 2 is a microphotograph magnified 150 times of a satisfactory lap joint weld showing crystalline grain growth in the middle of the joint.

Turning now to FIG. 2 which is a microphotograph enlarged 150 times taken longitudinally along a lap joint, it will be noted that the grain size through the center of the lap joint is much greater. This evidences proper welding heat and forging pressure as is necessary to produce a continuous seamless bond. The grain growth is schematically represented in FIG. 1 as a weld nugget and is a crystalline area located primarily at the joint where a weld current pulse occurs. The pulsing is frequent enough to produce a continuous seamless joint but there are areas of greater grain growth which are consequence of the varying heat. The depiction in FIG. 1 is exaggerated for purposes of understanding and the microphotograph shown in FIG. 2, is representative of the actual joint at the lap seam. This microphotograph represents a longitudinal section taken through the center of the lap joint and as such the ripples caused by the weld pulses are not immediately apparent along the outer surface of the joint. That is to say that, with the magnification and the process used to generate this cross-section, it is difficult to show in such a small portion of a longitudinal side seam weld the actual rippled surface as exaggerated and depicted in FIG. 1.

Figure 3:
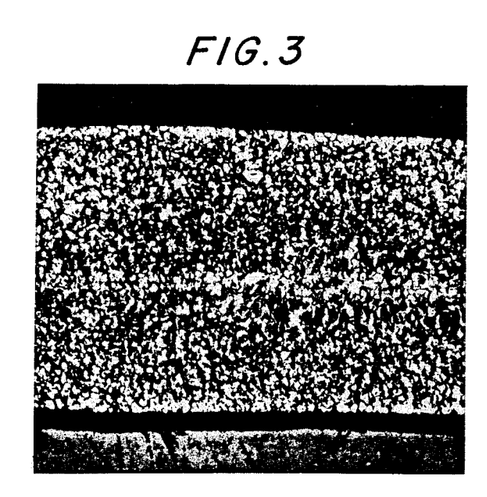
FIG. 3 is a microphotograph magnified 150 times of a faulty weld showing the line between the lap with very little or no appreciable crystalline grain growth thereby evidencing in a cold or no weld situation.

In FIG. 3, an enlarged (150 times) microphotograph of a welded seam which is unsatisfactory is shown. The weld in this microphotograph is poor because insufficient heat was available to join the overlapped metals. As will be noted, there is a line at the middle of the joint which shows the complete failure to bond or weld. There is also a notable lack of crystalline growth in the central portion where the layers are juxtaposed. This depicts clearly a difference which without destructive analysis cannot be readily determined.

It has been found that the waveform generated by the accelerometer 10 of FIG. 1 varies depending upon the nature of the weld e.g., that shown in FIG. 2 or FIG. 3. More particularly, as the amount of energy put into the weld increases the slope of the accelerometer spike, indicative of vertical acceleration will become more steep. In the event there is too much energy applied and/or force at the upper electrode 15, the spike will become so steep that longitudinal microphotographs of welds produced will show almost entirely crystalline structure having large grain areas and rough outer surfaces in that the overlapped metal is severely worked and spattered. Conversely, in the situation where the pressure and/or energy is inadequate the slope of the spike will be more horizontal indicating little or no forging during welding. When checked by microphotographs, the result will be like FIG. 3 with perhaps even greater spacing between the lapped metal which indicates complete failure to form a seam.

In FIG. 1, the accelerometer 10 is shown schematically. However, in the preferred embodiment a Model EGC-500DS-50 Miniature Heavy Duty Accelerometer made by Entran Devices, Inc., of New Jersey was used. This transducer has a compensated operating range of 80° to 180° and is linear to ±, less than 1%. The particular unit used in the preferred embodiment has a range of ±50 units of acceleration relative to the motion of the device with a sensitivity norm of 4 mV per unit of acceleration and a useful frequency of up to 600 Hz.

The accelerometer was installed atop the spindle 11 inside the spring 13. In order to electrically isolate it from the power transmitted to the outer electrode 15, an insulator 20 was included between the spindle 11 and the lever arm 21 which is used to carry the outer electrode roll 15. More particularly, electrode roll 15 rotates about a central axis 22 which is disposed at one end of arm 21 and the other end of arm 21 an axis 23 carries it for swinging motion relative to the main support for the welder. Similarly, inner electrode roll 16 is carried for rotation on its axis 24 on the main support of the welder. The difference between electrode outer roll 15 and the inner electrode roll 16 is that the outer 15 is permitted to swing with arm 21 relative to the welder.

The lap joint 25 in FIG. 1 consists of the outer overlap portion 26 of the can body and the inner underlap portion 27 of the can body. These are brought together by conventional means (not shown), which rolls the flat precut body blank into an individual can tube arranged to have the desired amount of overlap and positioned to travel between electrode rolls 15 and 16. Two feed fingers 28 (only one is shown) push and square the can body with respect to the electrode rolls 15 and 16. Can bodies may be fed at 30 to 35 meters per minute which will make a 211×604 can at a rate of 180 per minute. Such a can is made out of 75 pound plate being the common can maker's designation of pounds of steel per base box. The latter being a fixed area of 31,360 square inches per side of plate in a base box. The Soudronic's welder will put out between 20 to 25 pulses per inch, i.e., spot welds and the speed of the seam welding is a function of the weight of the plate from which the body is fashioned. At a given seam welding speed, production rate will increase as can height decreases. Thinner materials will permit higher seam welding rates. Between each container there is a space whereby the next adjacent can is approximately 1 to 2 m.m. from the preceding can. The correct distance between adjacent can bodies must be maintained uniform at all times. If the containers are too closely spaced they will hit resulting in either a bad weld at the end or even welding together. Alternatively, if the containers are too far apart there will be a weld buildup at the longitudinal leading and trailing ends of the side seam. The distance between cans is adjustable by changing the electrode wire speed and can be easily determined from the weld wire after it has passed through the electrode rolls. Starting at the left side of FIG. 4, the accelerometer 10 is shown in block diagram form. Above accelerometer 10 is shown the type of trace being seriatum instantaneous transducer output which might appear on an oscilloscope were it to be used as herein described. The output of the accelerometer 10 is connected to a calculator circuit which could be programmed to calculate the area under a portion of the accelerometer trace or to approximate the slope of a portion of the accelerometer trace. Such curves are shown adjacent to the calculator circuit block. A differentiator or integrator can be used in the calculator circuit.

Figure 4:
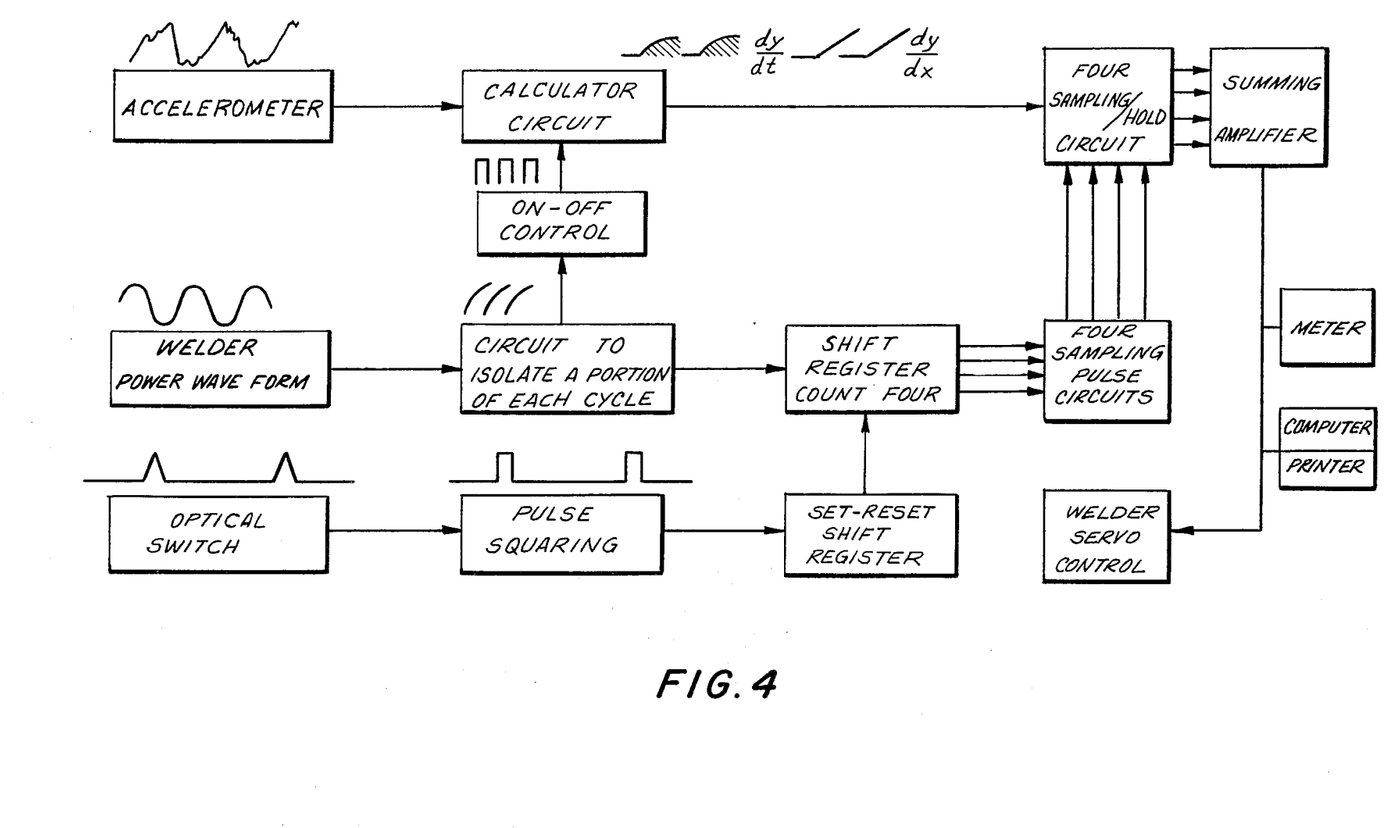
FIG. 4 is a schematic block circuit diagram with wave and pulse diagrams showing the output of the accelerometer and how it is used to regulate the welder.

It is important to appreciate that the trace taken from the accelerometer should be representative of an average welding pulse. For this purpose circuitry below the accelerometer block and calculator circuit block are included. More specifically, a trace of the welder power waveform is used to determine the portion of each pulse to which the calculator circuit reacts. More particularly, the output of the Soudronic's welder power supply alternator should be a pure and repeatable waveform which is synchronized but phase shifted with respect to the pulse depicted by the accelerometer output trace. The power waveform is input to a circuit which isolates the preferred portion of each cycle for analysis. That is to say that, the timing of when the calculator circuit operates is controlled by the isolation circuit such that an output of the isolation circuit will operate as an on/off control for the calculator circuit.

To be certain that the accelerometer trace is taken during a representative portion of the welding of an individual can body an optically actuated switch is used to signal when the can body is disposed under the accelerometer 10. It is preferred that readings be taken at a more central portion of the can body such that transients at the ends of the container are not included. The optical switch is positioned to signal a pulse squaring circuit when the timing for accelerometer readings is proper. The squared pulse thus issuing sets a shift register set-reset circuit which controls a shift register designed to take four readings seriatum. Triggering of the shift register is also accomplished by a signal from the isolation circuit. Consequently, the shift register reacts in accordance with signals from the isolation circuit and the optical switch whereby four readings are taken during a prescribed portion of a can cycle.

The four readings are sent from the shift register to four circuits for pulse sampling. The four samples obtained are then sent to a sample and hold circuit for each. The output from the calculator circuit is thus controlled and evaluated as data obtained in accordance with sample and hold. The four signals once analyzed are independently sent to a summing amplifier which averages the signals and gives a common overall output. The output is thus available for control of a Soudronic welder by means of an adjustment as described. The output is also available for reading on a meter, or an oscilloscope or as input for a computer and printer.

Figure 5:
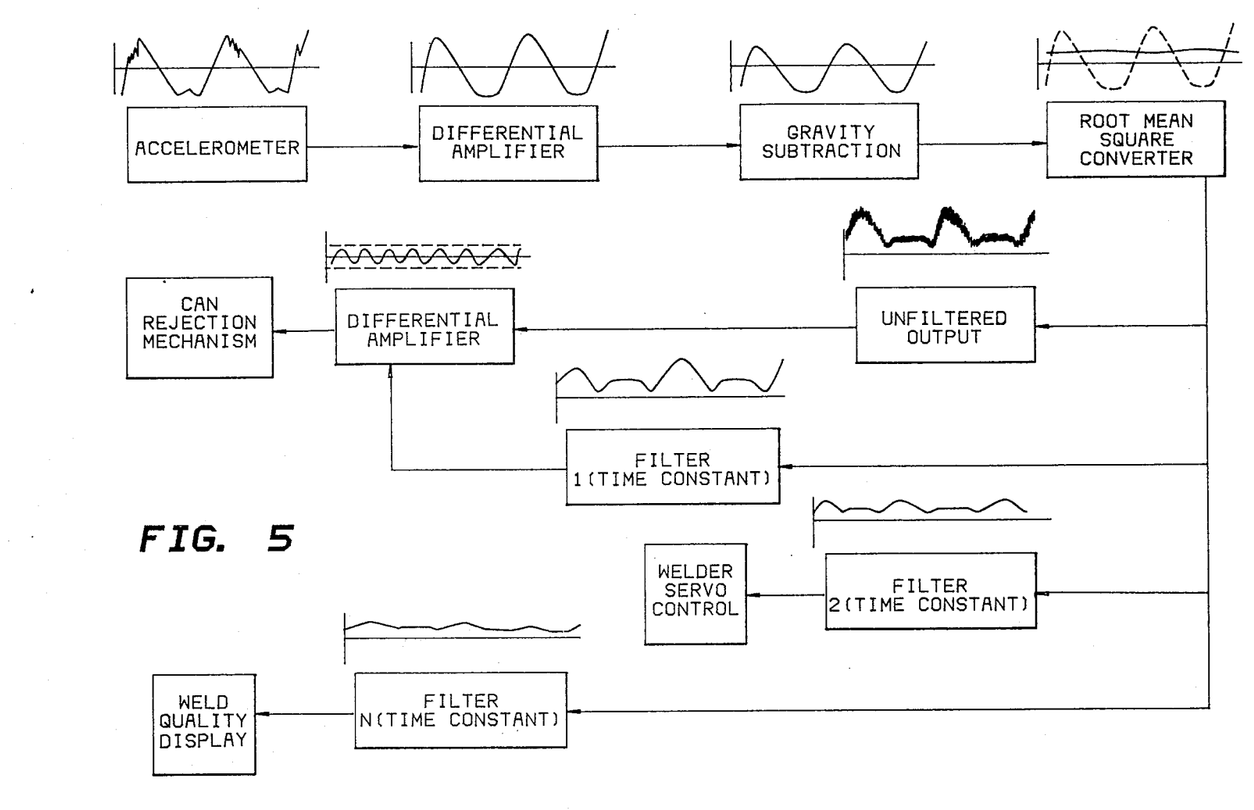
FIG. 5 is a block diagram of an alternate form of loop feedback system.

The signals from the accelerometer can be used to provide a continuous signal suitable for use in a closed loop control system. In FIG. 5, a block diagram is shown for an arrangement which can be used to constantly monitor the welding process in contradistinction to the monitoring technique already disclosed. Examination of the entire side seam weld for a container is considered advantageous, but the ability to disregard information from unwanted inputs is difficult to overcome. Inputs such as vibrations from the various machine mechanisms or welding discontinuities because of the gap between containers have been major stumbling blocks. The circuit disclosed in FIG. 5 recognizes the problems of such inputs by analysis of the entire waveshape from the accelerometer output. This technique is different from the previously discussed technique in that more than a single side of a waveform or polarity of the accelerometer output is used.

Computing techniques such as the use of RMS (Root Mean Square) calculations for analysis of the total accelerometer waveform output are meaningful. The results of such a calculation are a single polarity DC output which with filtering yield a visual presentation of the welder performance. Similarly, such an output can be used in a closed loop control system to adjust welder operation parameters on a slowly changing basis. The degree of filtering can be tailored to adjust the response time for the control loop or visual display. In addition, a filtered output signal can be used as a tracking reference to set the limits imposed for individual welding pulse analysis.

The use of RMS conversion of the accelerometer signal appears to meet three primary requirements considered important to weld quality. That is to say that, the signal necessary for visual monitoring of welding performance is available. Moreover, a signal necessary for closed loop control of the process is provided. Finally, the reference value necessary for tracking an individual weld pulse and thereby detecting questionable weld nuggets is obtainable. The circuit design blocked out in FIG. 5 allows for easy compensation of the effects of gravity (for welder operating in a vertical plane) on the weld monitoring system so that the final output signal is of the form:

$$e_{(out)} = \left[ \sum_{i=1}^{N} \frac{(ein_s)^2}{N} \right]^{\frac{1}{2}} - ein_g$$

where
$e\ in_s = f(d^2x/dt^2)$
where
  $x$ = displacement of weld forging mechanism
  $t$ = time
  $e\ in_g = f(\text{gravational effects})$ The output of the computational conversion can be filtered through a simple integrating function such as:

$$e(t) = \int_o^t e_{(out)} \, dt$$

where
  $t$ = the time constant of the filter circuit that sets the break point frequency of the low pass filters. Other types of filtering can be used to enhance specific characteristics of the signal.

FIG. 5 shows the accelerometer output above the block for the accelerometer. The two leads of the accelerometer are connected to a differential amplifier which amplifies their output and rejects the common noise in both leads. The output from the differential amplifier is connected to a device which accounts for the effects of gravity. The device is based on an AC coupled amplifier with unity gain which centers the signal relative to the horizontal axis of the waveform. The corrected signal is then sent to a Root Mean Square converter. Such devices are useful for measuring electrical signals derived from mechanical phenomena, such as strain, stress, vibration, shock, bearing noise and acoustical noise. The electrical signals produced by these mechanical actions are often noisy, non-sinusoidal and superimposed on DC levels. The requirement for true RMS to provide a constant, valid and accurate measurement is satisfied by the converter. The waveform signal below the horizontal axis is shifted above the horizontal axis by squaring, and the output is changed from a waveform to a DC level or value for each welding pulse. Those individual values are a function of the shape and amplitude of the particular wave. The output from the Root Mean Square converter consists of a series of individual DC values which are representative of some parameter consistent with each welding pulse. It has been found that this parameter can be used as a measure of the successful or unsuccessful operation of the welder.

For comparison and evaluation purposes, the unfiltered output of the RMS converter is provided to one side of a comparator differential amplifier and a filtered output is provided to the other input of the comparator differential amplifier. The filter is basically a low pass unit which is in the nature of an integrating amplifier. A resistance capacitance circuit sets the time constant for the integration. The comparator uses the filtered input as one reference against which the unfiltered input is analyzed. Should an individual DC level of the unfiltered input be substantially different from the datum established by the waveform of the filtered input a signal is transmitted from the comparator to a can rejection mechanism at the right time which automatically winnows the defective can from the production stream.

Varying the amount of filter changes the waveform and the reference in FIG. 5 to 1 (time constant) or 2 (time constant) is merely illustrative. Other connections to the output of the Root Mean Square converter lead to a welder control filter where the time constant is greater than that of the can rejection filter. Such a waveform establishes a slower and smoother rate of fluctuation as a function of the unfiltered signal. This filter may have twice the time constant of the can rejection filter and as such would provide a signal capable of adjusting welder parameters as mentioned herein frequently enough to keep the welder operating at peak performance. Likewise, a final filter with a still greater time constant called "N" can be used to amend the unfiltered signal sufficiently so that a visual weld quality display can be provided which will fluctuate with an appropriate frequency to exhibit the general trend of operation, thus permitting an operator to oversee the ultimate function of the machine.

Consequently, the process of welding can be monitored, recorded and/or controlled by means of a simple device which measures and analyzes the actual process of forging during resistance welding. It is, therefore, desired that the invention in its broadest context include all circuits and transducer devices which operate to measure and evaluate the forging action which occurs during automatic welding. The claims which follow are intended to include all such arrangements and approaches which will achieve the concept hereinbefore stated.

What is claimed is:

1. A method of measuring the relative quality of a resistance pulse welding operation on a thin metallic can body side seam including the following steps:
   transporting said side seam between a pair of electrodes for welding at a prescribed rate of speed while energizing the electrodes with a pulsing power supply and mechanically forcing them toward one another,
   measuring the relative acceleration of one of said electrodes in a direction normal to the movement of said seam between said electrodes to determine the relative quality of the resistance pulse welded seam by changes in the acceleration.

2. The method of claim 1 wherein said measuring takes place by means of an acceleration sensitive transducer and said electrode is vertically disposed so that said transducer attached to said electrode moves vertically to and from the welded seam in response to motion imparted to the electrode during said pulse welding operation.

3. The method according to claim 2 wherein said transducer is an accelerometer operatively responsive to the rate of change of motion of said electrodes during welding in response to said pulsing.

4. The method of claim 3 wherein said output signal with respect to time is analyzed by an electronic circuit for comparing signal differences from pulse to pulse.

5. An apparatus for measuring variations in movement of a welder electrode during an electrical resistance heating and forging welding process comprising:
   means for supporting a juncture at a container side seam to be welded in a dynamic pulse type welding operation of a container side seam while same is carried between a pair of spaced apart but biased resiliently toward each other power carrying electrode means to press against said juncture for welding and forging same,
   power supply means connected to said electrode means to establish a pulsing, high frequency potential difference across electrode means therein and through said juncture therebetween,
   acceleration sensitive transducer means associated with one of said electrode means and being responsive to movement thereof and responsive to said pulsing in directions other than parallel to said juncture to provide a measurable signal as a result of the changes in forging motion resulting from said electrode means as sensed by said acceleration transducer.

6. The apparatus of claim 5 wherein said power supply means includes a pulsing electrical current supply connected across said electrode means and said resiliently biased electrode means is positioned to provide the mechanical force normal to said juncture such that said acceleration sensitive transducer means responds to the influence of each pulse of energy and the motion of said carried juncture between said electrode means.

7. The apparatus of claim 6 including a transportation means being a mechanism designed to longitudinally move a hollow cylindrical tube formed from a thin sheet of metallic material rolled to have a juncture along a longitudinal side seam between said electrode means including a pair of electrode rolls which include a highly conductive electrode wire disposed to move in the spaces between said rolls and said juncture at adjustable rate of relative speed.

8. The apparatus of claim 7 wherein said acceleration sensitive transducer means is an accelerometer carried on an insulator attached to the axle support for one of said rolls and said accelerometer is connected to electronic means for recording the output waveform resulting from motion of said axle in directions other than parallel to said juncture.

9. A weld quality measuring device for a welder of the pulse resistance type for use in connection with welding the longitudinal side seam of a thin metallic hollow tubular open ended can body comprising:
   a power supply means for providing high frequency electrical power,
   a pair of juxtaposed electrode means connected to said power supply and including a pair of juxtaposed counter-rotating rollers carrying across the nip therebetween a highly conductive electrode current carrying wire and the juncture of said side seam to be welded,
   a means for moving said highly conductive wire and said side seam in relation to said electrode rolls to produce a uniform rate of pulse resistance welding power application along the length of said side seam, and
   an accelerometer mounted to move with one of said electrode rolls in any direction other than parallel to the direction of said longitudinal side seam to provide a signal relative to the motion of said electrode resulting from the discontinuities in the material in said seam to be welded and the instantaneous variations in acceleration of said one electrode due to the mechanical force applied to said side seam by said electrodes, the pulsing of power and the metal in the seam.

* * * * *